United States Patent
Batenburg et al.

(10) Patent No.: US 10,807,345 B2
(45) Date of Patent: Oct. 20, 2020

(54) CONSTRUCTION MATERIAL

(71) Applicant: Redeahold Apeldoorn B.V., Wapenveld (NL)

(72) Inventors: Lawrence Fabian Batenburg, Eindhoven (NL); Henricus Johannes Maria Van Tilburg, Eindhoven (NL)

(73) Assignee: Redeahold Apeldoorn B.V., Wapenveld (NL)

(*) Notice: Subject to any disclaimer, the term of this patent is extended or adjusted under 35 U.S.C. 154(b) by 267 days.

(21) Appl. No.: 15/763,815

(22) PCT Filed: Dec. 28, 2015

(86) PCT No.: PCT/NL2015/050911
§ 371 (c)(1),
(2) Date: Mar. 27, 2018

(87) PCT Pub. No.: WO2016/108686
PCT Pub. Date: Jul. 7, 2016

(65) Prior Publication Data
US 2019/0047259 A1 Feb. 14, 2019

(30) Foreign Application Priority Data
Dec. 29, 2014 (EP) .................................... 14200418

(51) Int. Cl.
*B32B 15/082* (2006.01)
*B32B 15/085* (2006.01)
*B32B 15/20* (2006.01)
*B32B 27/30* (2006.01)
*B32B 27/32* (2006.01)
*B32B 3/26* (2006.01)
*B32B 27/40* (2006.01)
*B32B 27/42* (2006.01)
*B32B 15/08* (2006.01)
*B32B 15/095* (2006.01)
*B32B 15/098* (2006.01)
*E04D 13/147* (2006.01)
*B32B 15/02* (2006.01)
*B32B 27/20* (2006.01)
*B32B 27/22* (2006.01)
*E04D 13/14* (2006.01)

(52) U.S. Cl.
CPC ............ *B32B 15/082* (2013.01); *B32B 3/266* (2013.01); *B32B 15/02* (2013.01); *B32B 15/08* (2013.01); *B32B 15/085* (2013.01); *B32B 15/095* (2013.01); *B32B 15/098* (2013.01); *B32B 15/20* (2013.01); *B32B 27/20* (2013.01); *B32B 27/22* (2013.01); *B32B 27/30* (2013.01); *B32B 27/302* (2013.01); *B32B 27/306* (2013.01); *B32B 27/32* (2013.01); *B32B 27/40* (2013.01); *B32B 27/42* (2013.01); *E04D 13/147* (2013.01); *B32B 2250/03* (2013.01); *B32B 2274/00* (2013.01); *B32B 2307/51* (2013.01); *B32B 2307/536* (2013.01); *B32B 2307/54* (2013.01); *B32B 2307/71* (2013.01); *B32B 2307/712* (2013.01); *B32B 2307/7265* (2013.01); *B32B 2419/00* (2013.01); *B32B 2419/06* (2013.01); *E04D 13/14* (2013.01)

(58) Field of Classification Search
CPC .................................................... B32B 15/082
USPC .......................................................... 428/138
See application file for complete search history.

(56) References Cited

U.S. PATENT DOCUMENTS

2004/0076841 A1   4/2004   Sauer et al.

FOREIGN PATENT DOCUMENTS

| EP | 0 109 505 | 5/1984 | |
|---|---|---|---|
| EP | 1 072 732 | 1/2001 | |
| EP | 2 602 095 | 6/2013 | |
| WO | WO-95/31620 | 11/1995 | |
| WO | WO-9531620 A1 * | 11/1995 | ........... E04D 13/147 |
| WO | WO-02/28635 | 4/2002 | |
| WO | WO-2008/130201 | 10/2008 | |
| WO | WO-2013/066166 | 5/2013 | |
| WO | WO-2013066166 A1 * | 5/2013 | ............. B32B 3/266 |

OTHER PUBLICATIONS

International Search Report and Written Opinion for PCT/NL2015/050911, dated Jun. 6, 2016, 11 pages.

* cited by examiner

*Primary Examiner* — Brent T O'Hern
(74) *Attorney, Agent, or Firm* — Morrison & Foerster LLP

(57) ABSTRACT

The invention is directed to a construction material, to a method for preparing a construction material, and to the use of a construction material. The construction material of the invention comprises a perforated sheet of metal and on at least one side of the perforated sheet of metal a thermoplastic layer comprising poly(vinyl butyrate), wherein said thermoplastic layer has i) a modulus of elasticity as measured according to ISO 527 of 0.6-2.0 MPa, preferably in the range of 0.8-1.8 MPa, ii) a shore A hardness as measured according to ISO 7619-1 in the range of 25-65, preferably in the range of 35-50, and iii) an elongation at break as measured according to ISO 527 of 250-400%, preferably 275-375%.

29 Claims, No Drawings

CONSTRUCTION MATERIAL

CROSS-REFERENCE TO RELATED APPLICATIONS

This application is the national phase of PCT application PCT/NL2015/050911 having an international filing date of 28 Dec. 2015, which claims benefit of European patent application No. 14200418.3 filed 29 Dec. 2014. The contents of the above patent applications are incorporated by reference herein in their entirety.

The invention is directed to a construction material, to a method for preparing a construction material, and to the use of a construction material.

At the transition of construction materials in a building, it is commonly known to apply lead sheet, also known as lead flashings. Lead has unique properties, which renders it highly suitable for these construction applications. Such transitions, for instance, exist in the connection of skylights, dormer windows or chimneys with the actual roof covering, such as tile roof. Lead, however, has a number of disadvantages. Lead, for example, slowly dissolves in course of time, thereby causing the lead sheet to become thinner with the risk of ruptures. Additionally, the dissolved lead is flushed away and ends up in the environment. Evidently, contamination of the environment with such a heavy metal is highly undesirable. Furthermore, lead is relatively heavy, which causes high costs of transportation and handling difficulties.

In view of the disadvantages of lead, there have been different efforts in designing a construction material that can be used as a suitable substitute for lead.

U.S. Pat. No. 4,248,926, for example, describes a flashing sheet that is composed of a base sheet consisting of a synthetic fibre fabric and at least one modified bitumen layer laminated on a surface of the base sheet. The synthetic fibre fabric has high expandability and stretchability in all directions. The bitumen layer contains a mixture of bitumen and rubber. The rubber is blended into the bitumen so as to impart flexibility and expandability at ambient temperature to the bitumen.

WO-A-2007/015637 describes a covering material for roofs, wherein a web of stretch aluminium mesh is enveloped with bituminous material on all sides. The bituminous layer is modified with a thermoplastic elastomer so that the bituminous material can be better applied on the mesh.

WO-A-2008/130232 describes a composite water-retaining sheet material that comprises a layer of bituminous material and a covering gritty layer comprising synthetic granules. The granules can be prepared from a material with a melt flow index between 40-60 and/or the bituminous material can be modified with amorphous poly-α-olefins (APAO), styrene-ethylene-butylene-styrene (SEBS), styrene-butadiene-styrene (SBS), or atactic polypropylene (APP).

A disadvantage of the use of bitumen is that bitumen starts to flow at high temperatures, while becoming brittle at low temperatures. This severely restricts the application conditions of the construction material. Additionally, recycling of the construction material is difficult, because the different type of materials cannot be readily separated.

WO-A-2010/110661 describes a reinforced covering material that comprises a reinforcement layer with apertures and a polyurethane-based layer arranged at least at one side of the reinforcement layer. The polyurethane-based layer has 20-100% by weight of the polyurethane-based layer of thermosetting polyurethane and extends through the apertures of the reinforcement layer. Polyurethane being a thermoset, it is difficult to recycle this construction material. Furthermore, the properties of the polyurethane-based material are inferior to the convention lead flashings.

WO-A-2013/066166 is directed to a covering material comprising a layer of plastically deformable metal mesh that is accommodated between a first silicone-based sheet and a second silicone-based sheet, which sheets are glued together by means of a cured filling silicone-based adhesive. The silicone-based material, however, is a cross-linked thermoset material that does not allow easy recycling of the individual materials.

WO-A-95/31620 describes a plastically deformable flashing material for roof flashing purposes in connection with roof windows and similar roof penetrating building structures, consisting of a sheet-, web- or strip-shaped expanded-metal grid covered on both sides by an elastomeric layer.

Some commercial lead substitute flashing products currently exist on the market, such as Ubiflex™ available from Ubbink Ltd, and Perform™ available from Meir roofing & Insulation Supplies.

However, there remains a need in the art for construction materials that can be used a proper lead substitutes, in particular materials that have mechanical properties highly similar to the conventional lead flashings.

An objective of the invention is to address this need in the art and provide a suitable lead substitute construction material.

The inventors found that this objection can, at least in part, be met by a construction material based on a thermoplastic material that complies with specific physical properties.

Accordingly, in a first aspect the invention is directed to a construction material comprising a perforated sheet of metal and on at least one side of the perforated sheet of metal a thermoplastic layer, wherein said thermoplastic layer has i) a modulus of elasticity as measured according to ISO 527 of 0.6-2.0 MPa, preferably in the range of 0.8-1.8 MPa, ii) a shore A hardness as measured according to ISO 7619-1 in the range of 25-65, preferably in the range of 35-50, and iii) an elongation at break as measured according to ISO 527 of 250-400%, preferably 275-375%.

The construction material of the invention is a very good substitute for conventional lead, typically for applications where lead flashings are being applied. While not suffering from the disadvantages of lead (environmentally unfriendly and relatively heavy weight), it has highly similar physical properties which render the material highly suitable for a working with and handling the construction material. Additionally, the thermoplastic nature of the organic layer allows for easy separation and recyclability of the organic material and the perforated sheet of metal.

The construction material of the invention further has high deformability over a wide temperature range including low temperature. This not allows application of the construction material on site, even at extreme conditions.

Perforated sheets of metal are well-known in the art and are commercially available. The perforated sheet of metal can, for instance, be in the form of a metal grid, mesh, web or netting. Preferably, the perforated sheet of metal is in the form of a metal mesh. The term "metal" as used in this application is meant to encompass metal alloys. In a preferred embodiment, the metal comprises or consists of aluminium. The metal may have been submitted to a tempering or re-crystallisation treatment, so as to reduce the deformation tensions arising at the manufacture of the perforated sheet of metal, whereby the perforated sheet of metal is more readily deformed. The perforated sheet of metal is preferably expanded or stretched to further enhance plastic deformability. This is, for example, known from WO-A-95/31620.

In an embodiment, the perforated sheet of metal is in the form of a metal mesh (typically gauze-shaped), and is manufactured from a metal plate that is cut in at the location of the meshes to be formed (or slit perforated) and which is subsequently stretched for transforming the cut-ins into meshes bounded by metal strips, while having the metal strips tilt from and with respect to the main plane of the metal plate. It is preferred that at, at least one, preferably both of the main planes of metal planes of the metal mesh the edges of the tilted metal strips are flattened, in particular to form surfaces that are parallel to the main planes. In this manner, the risk of damaging the thermoplastic layer by the edges is reduced or even avoided.

The perforations of the perforated sheet of metal can have a mesh size of 0.1-30 mm, preferably 0.2-25 mm, such as 0.3-20 mm. The thickness of the perforated sheet of metal can be in the range of 0.1-5 mm, such as 0.2-4 mm, or 0.2-3 mm. These mesh sizes and thicknesses, however, are not critical to the invention, and are largely dependent on the application sought for. They can typically be used to adjust the exact properties of the construction material to the need of the specific application, such as the flexibility of the construction material and the wind uplift properties.

The thermoplastic layer preferably comprises one or more selected from poly(vinyl chloride) (PVC); styrene butadiene copolymers (SBC) including poly(styrene-butadiene-styrene) (SBS), poly(styrene-ethylene/butadiene-styrene) (SEBS), and poly(styrene-ethylene/propylene-styrene) (SEPS); thermoplastic elastomers (TPEs) including vulcanised thermoplastic elastomers (TPE-V) and styrenic block copolymers (TPE-S); thermoplastic polyolefins (TPO); poly (vinyl butyrate); thermoplastic polyurethanes (TPU); and copolymers of ethylene and vinylacetate (EVA).

Poly(vinyl chloride) polymers useful according to the invention include those described in "vnyl chloride polymers" entry of Kirk-Othmer Encyclopedia of Chemical Technology, Vol. 24, 4$^{th}$ ed., (1997), pp. 1017-1053, the content of which is herewith completely incorporated by reference. For example, vinyl chloride resins such as homopolymers of vinyl chloride, copolymers of vinyl chloride and other vinyl monomers, halogenated compounds of their homopolymers, and alloys or blends with other plastics suitably may be used in the present invention.

In addition, suitable poly(vinyl chloride) polymers include homopolymers of vinyl chloride and those vinyl chloride polymer resins having 70% or more by total weight of the polymer of repeating units polymerised from a vinyl chloride monomer, or 80% or more, or 90% or more, or even 95% or more of repeating units polymerised from a vinyl chloride monomer.

The poly(vinyl chloride) may comprise repeating units polymerized from a vinyl chloride monomer, and may further comprise co-monomers up to 30% by total weight of the copolymer, said co-monomers begin selected, e.g., from one or more of: the esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinylidene chloride, vinylidene fluoride, and vinyl bromide; vinyl ethers such as ethylvinyl ether, chloroethyl vinyl ether and the like; the vinyl ketones, styrene derivatives including α-methyl styrene, vinyl toluene, chlorostyrene; vinyl naphthalene; olefins such as ethylene, butene, isobutylene, propylene and hexene; and other copolymerisable monomers or mixtures of monomers having suitable reactivity ratios with vinyl chloride and known to those skilled in the art. Styrene butadiene copolymers that may be used in this invention include poly(styrene-butadiene-styrene) (SBS), poly(styrene-ethylene/butadiene-styrene) (SEBS), poly(styrene-ethylene/propylene-styrene) (SEPS), hydrogenated styrene-isoprene copolymer, styrene-ethylene propylene (SEP) block copolymer, poly(styrene-ethylene/ethylene propylene-styrene) (SEEPS) and hydrogenated styrene-butadiene copolymer. Hydrogenated products that are copolymers or homopolymers of isoprene and butadiene-containing monomer units may also be used.

The general family of thermoplastic elastomers is normally identified with the abbreviation TPE. This abbreviation includes a large number of polymer, amongst others, vulcanised thermoplastic elastomers and styrenic block copolymers described above (TPE-S), thermoplastic polyamides, thermoplastic polyesters (TPE-E), and thermoplastic polyurethanes (TPE-U).

Good results have been obtained using a thermoplastic layer that comprises poly(vinyl butyrate). Poly(vinyl butyrate) can be produced by reacting poly(vinyl alcohol) with n-butyraldehyde in the presence of acid catalyst, followed by neutralisation of the catalyst, separation, stabilisation and drying of the poly(vinyl butyrate). It is commercially available from Monsanto Company as Butvar®. The conditions of the reaction between poly(vinyl alcohol) and n-butyraldehyde, and the concentration of the n-butyraldehyde and poly(vinyl alcohol) used are closely controlled to form polymers containing predetermined proportions of hydroxyl, acetate, and butyral groups. Although chemically not entirely correct, the term poly(vinyl butyrate) is in the art often interchangeably used with the term poly(vinyl butyral). As used in this application, the term "poly(vinyl butyrate)" is meant to refer to a polymer that comprises butyral groups, but can further comprise hydroxyl groups and acetate groups. Accordingly, poly(vinyl butyrate) as referred to in the present application comprises at least repeating unit A as depicted below, and can further comprise units B and C. Whenever the term "poly(vinyl butyrate)" is mentioned in this application, it can be interchanged with "polymer that comprises butyral groups".

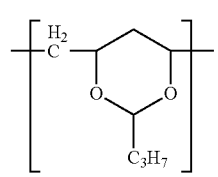

A

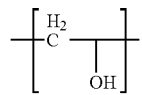

B

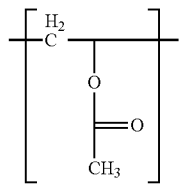

On a weight basis, the poly(vinyl butyrate) typically comprises 20% or less (such as 10-20% or 12-19%) of hydroxyl groups calculated as poly(vinyl alcohol). On a weight basis, the poly(vinyl butyrate) typically comprises 10% or less (such as 0-5% or 0-3%) of acetate groups calculated as poly(vinyl acetate). On a weight basis, the poly(vinyl butyrate) typically comprises 75% or more (such as 80-90% or 80-88%) of acetal groups, preferably butyral groups. Optionally, the poly(vinyl butyrate) can include a minor amount of acetal groups other than butyral, for example 2-ethyl hexanal.

Poly(vinyl butyrate) used for preparing the construction material of the invention may be virgin poly(vinyl butyrate), but it is also possible to use poly(vinyl butyrate) that originates from a recycle stream, such as from vehicle industry, where poly(vinyl butyrate) is e.g. used to laminate glass. Such poly(vinyl butyrate) is also known as waste poly(vinyl butyrate).

Another material that may be comprised in the thermoplastic layer of the construction material of the invention are copolymers of ethylene and vinylacetate (EVA). These copolymers are well-known in the art. These EVA copolymers can, for example, contain 25-35% by total weight of the copolymer of vinyl acetate, such as 27-32%.

Thermoplastic polyolefins (TPO) that can be used include polypropylene, polyethylene, and polybutenes. Generally at least one type of polypropylene is employed. The polypropylene is generally isotactic form of homopolymer but other forms of polypropylene such as syndiotactic or atactic may also be used. Polypropylene impact copolymers wherein in a second copolymerisation step, ethylene is reacted with polypropylene, may also be employed. Polypropylene random copolymers that usually contain 1-7% ethylene copolymerized with polypropylene can also be used. The reactor grade impact modified polypropylene can also be used.

Other polymers that may be comprised in the thermoplastic layer of the construction material of the invention include ethylene/propylene rubber without a non-conjugated diene termonomer (EPM) and ethylene/propylene rubber with a non-conjugated diene termonomer (EPDM). Non-conjugated dienes for use in EPDM are well known to the art and include 1,4-hexadiene, ethylidene norbornene, dicyclopentadiene, 5-ethylidene-2-norbornene, 1,3-cyclopentadiene, 5-vinylnorbornene, combinations thereof.

Further possible materials for use in the thermoplastic layer of the construction material include melt processable rubber, and fluoroelastomers such as copolymers of vinylidene fluoride and hexafluoropropylene.

In a preferred embodiment, the thermoplastic layer comprises poly(vinyl butyrate) having a weight average molecular weight greater than 70 000 g/mol, preferably in the range of 100 000-250 000 g/mol, as measured by size exclusion chromatography using low angle laser light scattering.

In an embodiment, the thermoplastic layer comprises 40% or more by total weight of the thermoplastic layer of poly(vinyl butyrate), preferably 60% or more, more preferably 70% or more, such as 75-95%.

The elastic modulus of the thermoplastic layer in the construction material of the invention as measured according to ISO 527 is preferably in the range of 0.6-2.0 MPa, preferably in the range of 0.8-1.8 MPa, such as in the range of 1.0-1.6 MPa.

The Shore A Hardness of the thermoplastic layer in the construction material of the invention as measured according to ISO 7619-1 is preferably in the range of 25-65, preferably in the range of 30-60, such as in the range of 35-50.

The elongation at break of the thermoplastic layer in the construction material of the invention as measured according to ISO 527 is preferably in the range of 250-400%, preferably in the range of 275-375%, such as in the range of 290-360%.

The thermoplastic layer in the construction material of the invention has at least one of an elastic modulus in the range of 0.6-2.0 MPa, a Shore A Hardness in the range of 25-65, and an elongation at break in the range of 250-400%. Suitably, the thermoplastic layer in the construction material of the invention has at least two of an elastic modulus in the range of 0.6-2.0 MPa, a Shore A Hardness in the range of 25-65, and an elongation at break in the range of 250-400%. In an embodiment, the thermoplastic layer in the construction material of the invention has an elastic modulus in the range of 0.6-2.0 MPa, a Shore A Hardness in the range of 25-65, and an elongation at break in the range of 250-400%. Depending on the application region and local weather type one of these physical properties may be sufficient, or more of these physical properties may be required. The person skilled in the art will be able to determine the local needs.

The yield stress of the thermoplastic layer in the construction material of the invention as measured according to ISO 527 is preferably 9-22 MPa, preferably 10-20 MPa, such as in the range of 12-18 MPa.

The thermoplastic layer that comprises poly(vinyl butyrate) preferably has a melt flow index as measured according to ISO 1133 at a load of 2.16 kg and at a temperature of 180° C. of 50-90 g/10 minutes, preferably 60-80 g/10 minutes.

The density of the thermoplastic layer in the construction material of the invention as measured according to ISO 1183 is preferably in the range of 1.00-1.50 g/cm$^3$, more preferably in the range of 1.01-1.20 g/cm$^3$, such as in the range of 1.02-1.10 g/cm$^3$.

The thermoplastic layer in the construction material of the invention can further be characterised in that a Charpy impact strength measurement at room temperature and/or at −20° C., as determined according to ISO 148, does not yield breakage of the material. Instead, the thermoplastic material remains intact.

The strain at break of the thermoplastic layer in the construction material of the invention as measured according to ISO 527 is preferably 50-500%, more preferably 60-450%, such as 70-400%.

These physical properties of the thermoplastic layer in the construction material of the invention can be adjusted and achieved in various manners.

For instance, it is possible to add one or more elastomers in order to soften the thermoplastic layer. Examples of suitable elastomers typically include copolymers prepared from at least two monomers selected from the groups of ethylene, propylene, butadiene, isobutene, isoprene, chloroprene, vinylacetate, styrene, acrylonitrile and (meth)acrylic acid ester with 1 to 18 C-atoms in the alcohol component.

Some examples of such elastomers include, e.g. ethylene-propylene rubbers (EPM) and ethylene-propylene-diene rubbers (EPDM). EPM rubbers are in general substantially free from double bonds, whereas EPDM rubbers can have 1-20 double bonds per 100 C-atoms. Such rubber elastomers are well-known in the art.

As diene monomers for EPDM rubbers, for example, the following can be used: conjugated dienes such as isoprene and butadiene; non-conjugated dienes with 5-25 C-atoms such as penta-1,4-diene, hexa-1,4-diene, hexa-1,5-diene, 2,5-dimethylhexa-1,5-diene and octa-1,4-diene; cyclic dienes such as cyclopentadiene, cyclohexadiene, cyclooctadiene and dicyclopentadiene; as well as alkenylnorbornenes such as 5-ethyliden-2-norbornenes, 5-butylidene-2-norbornenes, 2-methallyl-5-norbornenes, 2-isopropynyl-5-norbornenes and tricyclodienes such as 3-methyl-tricyclo (5.2.1.0.2.6)-3,8-decdiene, and mixtures thereof.

Another group of suitable elastomer rubbers are copolymers of ethylene with (meth)acrylic acid and/or esters thereof. Additionally, these rubbers can comprise carbonic acids such as maleic acid, fumaric acid, and/or derivatives thereof such as esters and anhydrides. The elastomer rubbers can further comprise epoxy-groups containing monomers.

Also elastomer core-shell particles can be used. In such particles the core can for example, comprise polybutadiene, polyisoprene, butadiene/acrylonitrile copolymer, styrene/butadiene copolymer, styrene/isoprene copolymer, ethylene/propylene copolymer, ethylene/$\alpha$-olefin copolymer, ethylene/$\alpha$-olefin/polyene copolymer, acrylic rubber, butadiene/(meth)acrylate copolymer, styrene/butadiene block copolymer, and styrene/isoprene block copolymer. The shell in such elastomer core-shell particles can comprise methyl methacrylate polymer, methyl methacrylate/glycidyl methacrylate copolymer, and the like.

In case the thermoplastic layer comprises one or more elastomers, the amount of the elastomers can be 30% or less by total weight of the thermoplastic layer, preferably in the range of 15-25%, more preferably in the range of 5-15%.

Another possibility for softening the thermoplastic layer is to add one or more plasticisers. Plasticisers that can be employed for the purpose of the invention include aromatic diesters (such as diisononyl phthalate, diisodecyl phthalate, linear dinonyl phthalate (L9P), dioctyl terephthalate, dibutyl phthalate, dioctyl phthalate, benzylbutylphthalate, and dihexyl phthalate), aliphatic diesters (such as diisononyl adipate, and diisodecyl adipate), aromatic sulphonamides (such as N-n-butylbenzenesulphonamide), aromatic phosphate esters (such as tricresyl phosphate and trixylyl phosphate), alkyl phosphate esters (such as tributyl phosphate and tri-iso-octyl phosphate), dialkylether aromatic esters (such as dibutoxyethyl phthalate), dialkylether diesters, tricarboxylic esters, polymeric polyester plasticisers, polyglycol diesters, alkyl alkylether diesters (such as dibutoxyethyl glutarate, di-(2-butoxyethyl) adipate, di-(butylethoxyethoxy)glutarate, and di-(butoxyethoxyethyl)adipate), aromatic trimesters (such as trioctyl trimellitate and tri-iso-octyl trimellitate), epoxodised esters, epoxidised oils (such as epoxidised soybean oil), chlorinated hydrocarbons or paraffins, aromatic oils, alkylether monoesters, naphthenic oils, alkylmonoesters, glyceride oils, paraffinic oils, silicone oils, linseed oils, citrate plasticisers (such as tributyl citrate), process castor oil, raw castor oil, derivatives of castor oil such as butyl ricinoleate, sebacate plasticisers (such as dibutyl sebacate), and any combination thereof.

In case the thermoplastic layer comprises one or more plasticisers, the amount of the plasticisers can be 30% or less by total weight of the thermoplastic layer, preferably in the range of 5-30%, more preferably in the range of 10-25%.

Further possibilities to adjust and achieve the physical properties of the thermoplastic layer include the addition of fillers, functional fillers, and nanoparticles to increase the elastic modulus and the Shore A Hardness. By blending in miscible polymers such as (meth)acrylates, poly(vinyl chloride) or polyurethane, the flow properties, the melt flow index, the Shore A Hardness, the elastic modulus, and/or the flexibility can be adjusted. Reactive polymers such as maleic anhydride grafted polymer, glycidyl methacrylate modified polymers (methyl or ethyl) acrylate modified polymers and the like can be used in order to change the flow properties, the melt flow index, the impact properties, the Shore A Hardness, the elastic modulus, and/or the flexibility of the material.

The thermoplastic layer in the construction material of the invention can further include various additives including, but not limited to, one or more selected from the group consisting of ultraviolet (UV) blocking agents, antioxidants, flame retardants, blowing agents, processing aids, pigments, dyes, fillers, antibacterial agents, release agents, heat stabilisers, light stabilisers, compatibilisers, inorganic material additives, surfactants, coupling agents, impact-reinforcing agents, lubricants, weather-resistant agents, adhesion aids, adhesives, and combinations thereof.

Preferably, the thermoplastic layer in the construction material comprises a flame retardant. The flame retardant can be a solid, a liquid, and combinations thereof. The flame retardant can include a melamine-containing compound, a nitrogen/phosphorus-based (N/P-based) flame retardant, a phosphorus-based flame retardant, a borate, a metal-containing flame retardant, and any combination thereof.

Examples of suitable melamine-containing compounds include melamine cyanurate, melamine phosphate, melamine pyrophosphate, melamine polyphosphate, 2,4,6-triamino-1,3,5-triazine, and mixture of piperazine pyrophosphate and melamine pyrophosphate.

Examples of suitable N/P-based flame retardants include melamine phosphate, melamine pyrophosphate, melamine polyphosphate, piperazine pyrophosphate, melamine pyrophosphate, a phosphonitrilic chloride, a phosphorus ester amide, a phosphoric acid amide, a phosphonic acid amide, a phosphinic acid amide, ammonium polyphosphate (APP), piperizine polyphosphate, and any combination thereof.

Examples of suitable phosphorus-based flame retardants include an organic phosphonic acid, a phosphonate, a phosphinate, a phosphonite, a phosphinite, a phosphine oxide, a phosphine, a phosphite or a phosphate, and any combinations thereof. Specific examples include phenylbisdodecyl phosphate, phenylbisneopentyl phosphate, phenyl ethylene hydrogen phosphate, phenyl-bis(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenylmethyl hydrogen phosphate, di(dodecyl)p-tolyl phosphate, tricresyl phosphate, triphenyl phosphate, dibutylphenyl phosphate, 2-chloroethyldiphenyl phosphate, and diphenyl hydrogen phosphate.

In an embodiment, the flame retardant is selected from triphenyl phosphate (TPP), resorcinol diphenyl phosphate (RDP), bisphenol A polyphosphate (BAPP), bisphenol A diphenyl phosphate (BPADP), bisphenol A diphosphate (BADP), ammonium polyphosphate (APP), piperizine polyphosphate, (2,6-dimethylphenol)-1,3-phenylene bisphosphate, and any combinations thereof.

Examples of suitable metal-containing flame retardants include metal hydrates such as magnesium hydroxide, aluminium trihydrate ($Al_2O_3.H_2O$; (ATH), also referred to as aluminium hydroxide $Al(OH)_3$), huntite, hydromagnesite, antimony trioxide, potassium hydroxide, zirconium oxide, titanium oxide, zinc oxide, and/or magnesium oxide; metal carbonates such as magnesium carbonate and/or calcium carbonate; barium and/or borate based compounds such as barium sulphate, barium borate, meta-barium borate, zinc borate, and/or meta-zinc borate; and other flame retardants such as aluminium anhydrate, molybdenum disulphide, clay, diatomite, kaolinite, montmorillonite, hydrotalcite, talc, silica (e.g. precipitated silica and silicates, fumed silica, etc.), white carbon, celite, asbestos, ground minerals, and/or lithopone.

Preferably, the flame retardant is halogen-free. More preferably, the construction material is substantially or completely halogen-free.

The amount of the flame retardants can be 40% or less by total weight of the thermoplastic layer, preferably in the range of 2-40%, more preferably in the range of 5-35%, such as 5-30% or 7-25%.

Examples of suitable UV-blocking agents include titanium dioxide ($TiO_2$), carbon black, and combinations thereof.

Examples of suitable blowing agents include azodicarbonamide, expandable microspheres, p-p'-oxy-bis(benzenesulphonylhydrazide), p-toluene sulphonyl semicarbizide, sodium bicarbonate, citric acid, and any combination thereof.

The amount of the blowing agents can be 5% or less by total weight of the thermoplastic layer, preferably in the range of 0.01-4%, more preferably in the range of 0.05-3%.

Examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax, oxidised polyethylene wax, polymers of ethylene oxide; copolymers of ethylene oxide and propylene oxide; vegetable waxes; petroleum waxes; non-ionic surfactants; fluoropolymers (including polytetrafluoroethylene and the like); and polysiloxanes.

The amount of the processing aids can be 5% or less by total weight of the thermoplastic layer, preferably in the range of 0.05-5%, more preferably in the range of 0.1-3%.

Examples of suitable pigments include carbon black, titanium dioxide, and any combination thereof.

The amount of the pigments can be 10% or less by total weight of the thermoplastic layer, preferably in the range of 0.5-10%, more preferably in the range of 1-5%.

Examples of suitable dyes include organic dyes such as coumarins; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); xanthene dyes; and any combination thereof.

The amount of the dyes can be 5% or less by total weight of the thermoplastic layer, preferably in the range of 0.1-5%, more preferably in the range of 0.2-4%.

Examples of suitable fillers include carbon black, wollastonite, solid microspheres, hollow microspheres, kaolin, clay-based minerals, bauxite, calcium carbonate, feldspar, barium sulphate, titanium dioxide, talc, pyrophyllite, quartz, natural silica (such as crystalline silica and microcrystalline silica), synthetic silicates (such as calcium silicate, zirconium silicate, and aluminium silicate including mullite, sillimanite, cyanite, andalusite, and synthetic alkali metal aluminosilicates), microcrystalline novaculite, diatomaceous silica, perlite, synthetic silica (such as fumed silica and precipitated silica), antimony oxide, bentonite, mica, vermiculite, zeolite, and combinations of metals with various salts (such as calcium, magnesium, zinc, barium, aluminium combined with oxide, sulphate, borate, phosphate, carbonate, hydroxide, and the like), and any combination thereof.

The amount of the fillers can be 50% or less by total weight of the thermoplastic layer, preferably in the range of 10-40%, more preferably in the range of 5-10%.

Examples of suitable antioxidants include hindered phenols such as tetrakis[methylene(3,5-di-tert-butyl-4-hydroxyhydrocinnamate)] methane; bis[(β-(3,5-di-tert-butyl-4-hydroxybenzyl)-methylcarboxyethyl)] sulphide, 4,4'-thiobis (2-methyl-6-tert-butylphenol), 4,4'-thio-bis(2-tert-butyl-5-methylphenol), 2,2'-thio-bis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes, polymerised 2,2,4-trimethyl-1,2-dihydroquinoline, N,N'-bis(1,4-dimethylpentyl-p-phenylenediamine), alkylated diphenylamines, 4,4'-bis(α,α-dimethylbenzyl)diphenylamine, diphenyl-p-phenylenediamine, mixed di-aryl-p-phenylenediamines, and other hindered amine antidegradants or stabilisers, and any combination thereof.

The amount of the antioxidants can be 5% or less by total weight of the thermoplastic layer, preferably in the range of 0.1-5%, more preferably in the range of 0.2-3%.

Examples of the weather-resistance agents include benzophenone-type weather resistance agents, amine-type weather resistance agents, and combinations thereof.

The construction material of the invention, preferably comprises the thermoplastic layer on both sides of the perforated sheet of metal. It is known that some metals (such as aluminium) tend to corrode when being exposed to the environment for a period of time. However, if the perforated sheet of metal (such as aluminium) is enveloped (or sandwiched) by two of the thermoplastic layers, then corrosion of the metal can at least be reduced or even prevented, thereby rendering the construction material corrosion-proof. However, depending on the application, it is also possible, for instance, that the perforated sheet of metal only has the thermoplastic layer on one side, while the other side is exposed. Another possibility is that the perforated sheet of metal has the thermoplastic layer on one side, while the other side is covered with a layer of a different material.

The thickness of the thermoplastic layer may vary depending on the application. Typically, the thickness of each thermoplastic layer will be in the range of 0.1-4.0 mm, preferably in the range of 0.2-3.0 mm, such as in the range of 0.3-2.5 mm. In case the construction material of the invention has more than one thermoplastic layer, then the preferred thickness of each thermoplastic layer will be within these ranges.

The construction material can additionally comprise one or more protection layers, typically covering the thermoplastic layer at the side opposite the perforated metal sheet. Such a protection layer may typically be used to protect the thermoplastic layer, e.g., against heat and ultraviolet radiation. Such a protection layer will typically comprise one or more ultraviolet absorbers. Some examples of ultraviolet absorbers include benzotriazoles, hydroxybenzophenones, hydroxyphenyl triazines, esters of substituted and unsubstituted benzoic acids, and any combination thereof.

Further, the construction material may comprise one or more adhesive layers on the side of the construction material which is to be attached to a substrate, such as a roof. This adhesive layer can advantageously reduce or even avoid wind uplift of the construction material when applied. Suitably adhesives are well-known in the art and include, e.g., pressure-sensitive adhesives.

In the construction material of the invention, the metal mesh forms a plastic yet reinforcing component and the layer of thermoplastic material provides for penetration resistance and durability. The thermoplastic material is able to tightly adhere to the metal mesh and forms a durable structure. As a result, the construction material of the invention provides proper sealing and excellent waterproofing properties. Moreover, the construction material of the invention is relatively cheap.

In a further aspect, the invention is directed to a method for preparing the construction material of the invention, comprising preparing a thermoplastic material, and pressing on at least one side of a perforated sheet of metal a layer of the thermoplastic material, preferably by calendaring, wherein said thermoplastic layer has
i) a modulus of elasticity as measured according to ISO 527 of 0.8-2.0 MPa, preferably in the range of 1.0-1.8 MPa,
ii) a shore A hardness as measured according to ISO 7619-1 in the range of 35-55, preferably in the range of 40-50, and/or
iii) an elongation at break as measured according to ISO 527 of 250-400%, preferably 275-375%.

The layer of thermoplastic material is a layer as described hereinabove. The thermoplastic material can be provided in the form of an extruded cylinder which is subsequently subjected to the method of the invention. Likewise, the perforated sheet of metal can be provided in the form of a stretched metal mesh as described herein. Optionally, the layer of thermoplastic material can be pressed onto the perforated sheet of metal while still hot from the extruder. Alternatively, the thermoplastic layer can be manufactured prior to the method of preparing the construction material. Typically, the calendaring step is carried out at a temperature in the range of 5-50° C., preferably in the range of 20-40° C.

The construction material of the invention can be used for providing weather-proofing or water-proofing where desired, particularly for transitions between different construction elements, such as in roofs, as a covering layer thereon, particularly used for flashing rood lead-ins or "lead flashing", for use on and in chimneys, skylights, dormer windows, air ducts, attics and the like. The construction material protects the deck and the interior of the structure which upper surface it covers from the weather, including ultraviolet radiation, wind, rain and other precipitation.

Hence, in yet a further aspect the invention is directed to the use of the construction material of the invention for providing water-proofing and/or weather-proofing. The invention is particularly directed to the use of the construction material of the invention in roofs, and more in particular for water-proofing and/or weather-proofing the transitions between a roof and a chimney, skylight and/or dormer window. In an embodiment, the construction material of the invention can be used as a substitute for lead flashing.

Advantageously, the construction material of the invention is easily recyclable. By heating the material, the thermoplastic layer can be readily separated from the metal mesh, thereby allowing to recycle both the thermoplastic material as well as the metal mesh in their original form and/or function. This is in contrast to various thermoset materials described in the prior art.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will be further illustrated by means of the following non-limitative examples.

Measurement Methods

Elastic Modulus

The elastic modulus was determined in accordance with ISO 527.

Shore A Hardness

The Shore A Hardness was determined in accordance with ISO 7619-1.

Yield Stress

The yield stress was determined in accordance with ISO 527.

Melt Flow Index

The melt flow index was determined in accordance with ISO 1133 at a load of 2.16 kg and at a temperature of 180° C.

Elongation at Break

The elongation at break was determined in accordance with ISO 527.

Density

The density was determined in accordance with ISO 1183.

Charpy Impact Strength

The Charpy impact strength at room temperature and at −20° C. was determined according to ISO 148.

EXAMPLES

The following thermoplastic compositions were used for preparing a thermoplastic layer, which was combined with an aluminium mesh to prepare the construction material of the invention.

| Ingredient | Sample 1 (wt. %) | Sample 2 (wt. %) | Sample 3 (wt. %) |
| --- | --- | --- | --- |
| LDPE (low density polyethylene) | 5 | 0 | 0 |
| EVA (ethylene vinyl acetate) | 0 | 86.7 | 0 |
| poly(vinyl butyrate) | 66.7 | 0 | 76.8 |
| Polymeric impact modifier (elastomer) | 15 | 10 | 5 |
| UV blocking agent | 0.3 | 0.3 | 0.2 |
| Colourant | 3.0 | 3.0 | 3.0 |
| Plasticiser | 10 | 0 | 15 |
| Total | 100 | 100 | 100 |
| Elastic modulus (MPa) | 1.4 | 2.0 | 5.0 |
| Shore A Hardness | 50-59 | 45-53 | 38-45 |
| Elongation at break (%) | 340 | 210 | 270 |

The invention claimed is:

1. Construction material comprising a perforated sheet of metal and on at least one side of the perforated sheet of metal a thermoplastic layer, wherein said thermoplastic layer has
   i) a modulus of elasticity as measured according to ISO 527 of 0.6-2.0 MPa,
   ii) a shore A hardness as measured according to ISO 7619 1 in the range of 25-65, and
   iii) an elongation at break as measured according to ISO 527 of 250-400%.

2. Construction material according to claim 1, wherein the thermoplastic layer comprises one or more selected from the group consisting of poly(vinyl chloride) (PVC); styrene butadiene copolymers (SBC) including poly(styrene butadiene styrene) (SBS), poly(styrene ethylene/butadiene styrene) (SEBS), and poly(styrene ethylene/propylene styrene) (SEPS); thermoplastic elastomers (TPEs) including vulcanised thermoplastic elastomers (TPE V) and styrenic block copolymers (TPE S), thermoplastic polyolefins (TPO); poly (vinyl butyrate), and copolymers of ethylene; thermoplastic polyurethanes (TPU); and ethylene vinyl acetate (EVA).

3. Construction material according to claim 1, wherein the perforated sheet of metal comprises aluminium.

4. Construction material according to claim 1, wherein the perforated sheet of metal is an aluminium mesh.

5. Construction material according to claim 1, wherein said perforated sheet of metal is enveloped between two of said thermoplastic layers.

6. Construction material according to claim 1, wherein the perforated sheet of metal has a thickness in the range of 0.1-5 mm.

7. Construction material according to claim 1, wherein the perforated sheet of metal has a thickness in the range of 0.2-4 mm.

8. Construction material according to claim 1, wherein the perforated sheet of metal has a thickness in the range of 0.2-3 mm.

9. Construction material according to claim 1, wherein each thermoplastic layer has a thickness of 0.1-4.0 mm.

10. Construction material according to claim 1, wherein each thermoplastic layer has a thickness in the range of 0.2-3.0 mm.

11. Construction material according to claim 1, wherein each thermoplastic layer has a thickness in the range of 0.3-2.5 mm.

12. Construction material according to claim 1, wherein the thermoplastic layer comprises 40% or more by total weight of the thermoplastic layer of a polymer comprising butyral groups.

13. Construction material according to claim 1, wherein the thermoplastic layer comprises 60% or more by total weight of the thermoplastic layer of a polymer comprising butyral groups.

14. Construction material according to claim 1, wherein the thermoplastic layer comprises 70% or more by total weight of the thermoplastic layer of a polymer comprising butyral groups.

15. Construction material according to claim 2, wherein the thermoplastic layer comprises a polymer comprising butyral groups, said polymer having a weight average molecular weight of greater than 70,000 g/mol, as measured by size exclusion chromatography using low angle laser light scattering.

16. Construction material according to claim 15, wherein said polymer has a weight average molecular weight in a range of 10,000-25,000 g/mol, as measured by size exclusion chromatography using low angle laser light scattering.

17. Construction material according to claim 1, wherein said thermoplastic layer has a melt flow index as measured according to ISO 1133 at a load of 2.16 kg and at a temperature of 180° C. of 50-90 g/10 minutes.

18. Construction material according to claim 1, wherein said thermoplastic layer has a melt flow index as measured according to ISO 1133 at a load of 2.16 kg and at a temperature of 180° C. of 60-80 g/10 minutes.

19. Construction material according to claim 1, wherein said thermoplastic layer has a modulus of elasticity as measured according to ISO 527 of 0.8-1.8 MPa.

20. Construction material according to claim 1, wherein said thermoplastic layer has a shore A hardness as measured according to ISO 7619-1 in the range of 35-50.

21. Construction material according to claim 1, wherein said thermoplastic layer has an elongation at break as measured according to ISO 527 of 275-375%.

22. Construction material according to claim 1, wherein said thermoplastic layer has a yield stress as measured according to ISO 527 of 9-22 MPa.

23. Construction material according to claim 1, wherein said thermoplastic layer has a yield stress as measured according to ISO 527 of 10-20 MPa.

24. Construction material according to claim 1, wherein said thermoplastic layer has a yield stress as measured according to ISO 527 of 12-18 MPa.

25. Construction material according to claim 1, wherein said thermoplastic layer comprises a polymer comprising butyral groups.

26. Construction material according to claim 1, wherein said thermoplastic layer comprises one or more elastomers.

27. Construction material according to claim 26, wherein said one or more elastomers are selected from the group consisting of copolymers prepared from at least two monomers selected from the group of ethylene, propylene, butadiene, isobutene, isoprene, chloroprene, vinylacetate, styrene, acrylonitrile and (meth)acrylic acid ester.

28. Construction material according to claim 1, wherein said thermoplastic layer comprises one or more plasticisers.

29. Construction material according to claim 1, wherein said thermoplastic layer further comprises one or more additives selected from the group consisting of ultraviolet (UV) blocking agents, antioxidants, flame retardants, blowing agents, processing aids, pigments, dyes, fillers, antibacterial agents, release agents, heat stabilisers, light stabilisers, compatibilisers, inorganic material additives, surfactants, coupling agents, impact reinforcing agents, lubricants, weather resistant agents, adhesion aids, adhesives, and combinations thereof.

* * * * *